United States Patent [19]
Baver

[11] Patent Number: 5,246,241
[45] Date of Patent: Sep. 21, 1993

[54] ADJUSTABLE DECK TRAILER APPARATUS

[76] Inventor: Bruce W. Baver, Wild Run Rd., M.R. 1, Pennsburg, Pa. 18073

[21] Appl. No.: 872,845

[22] Filed: Apr. 23, 1992

[51] Int. Cl.$^5$ ............................................ B62D 33/077
[52] U.S. Cl. ............................. 280/407.1; 280/418.1; 280/789; 280/43.11; 414/495
[58] Field of Search ............. 280/405.1, 407.1, 415.1, 280/418.1, 490.1, 789, 423.1, 783, 43.11; 414/495

[56] References Cited

U.S. PATENT DOCUMENTS

| | | | |
|---|---|---|---|
| 2,904,340 | 9/1959 | Simpson | 280/789 |
| 4,290,642 | 9/1981 | Wise | 280/43.11 |
| 4,580,830 | 4/1986 | Holt et al. | 280/43.11 |
| 4,635,997 | 1/1987 | Holt et al. | 280/43.11 |
| 4,662,020 | 5/1987 | Wilkerson | 280/783 |
| 4,806,065 | 2/1989 | Holt et al. | 414/495 |
| 4,997,335 | 3/1991 | Prince | 414/495 |
| 5,092,721 | 3/1992 | Prince | 414/495 |

FOREIGN PATENT DOCUMENTS

| | | | |
|---|---|---|---|
| 1146763 | 4/1963 | Fed. Rep. of Germany | 280/418.1 |
| 2743224 | 4/1978 | Fed. Rep. of Germany | 280/789 |
| 1461657 | 2/1989 | U.S.S.R. | 414/495 |

Primary Examiner—Margaret A. Focarino
Assistant Examiner—Kevin Hurley
Attorney, Agent, or Firm—Leon Gilden

[57] ABSTRACT

A trailer construction includes forward and rear deck surfaces arranged in a central coplanar relationship having an intermediate deck vertically adjustable relative to the forward and rear decks. A hydraulic push bar is mounted below each forward and rear deck operative to project a push bar forwardly within the forward and rear portions of the trailer structure, with each push bar having rearwardly directed cables mounted to the intermediate trailer portion to effect raising and lowering of the trailer portion relative to the forward and rear surfaces of the trailer.

4 Claims, 4 Drawing Sheets

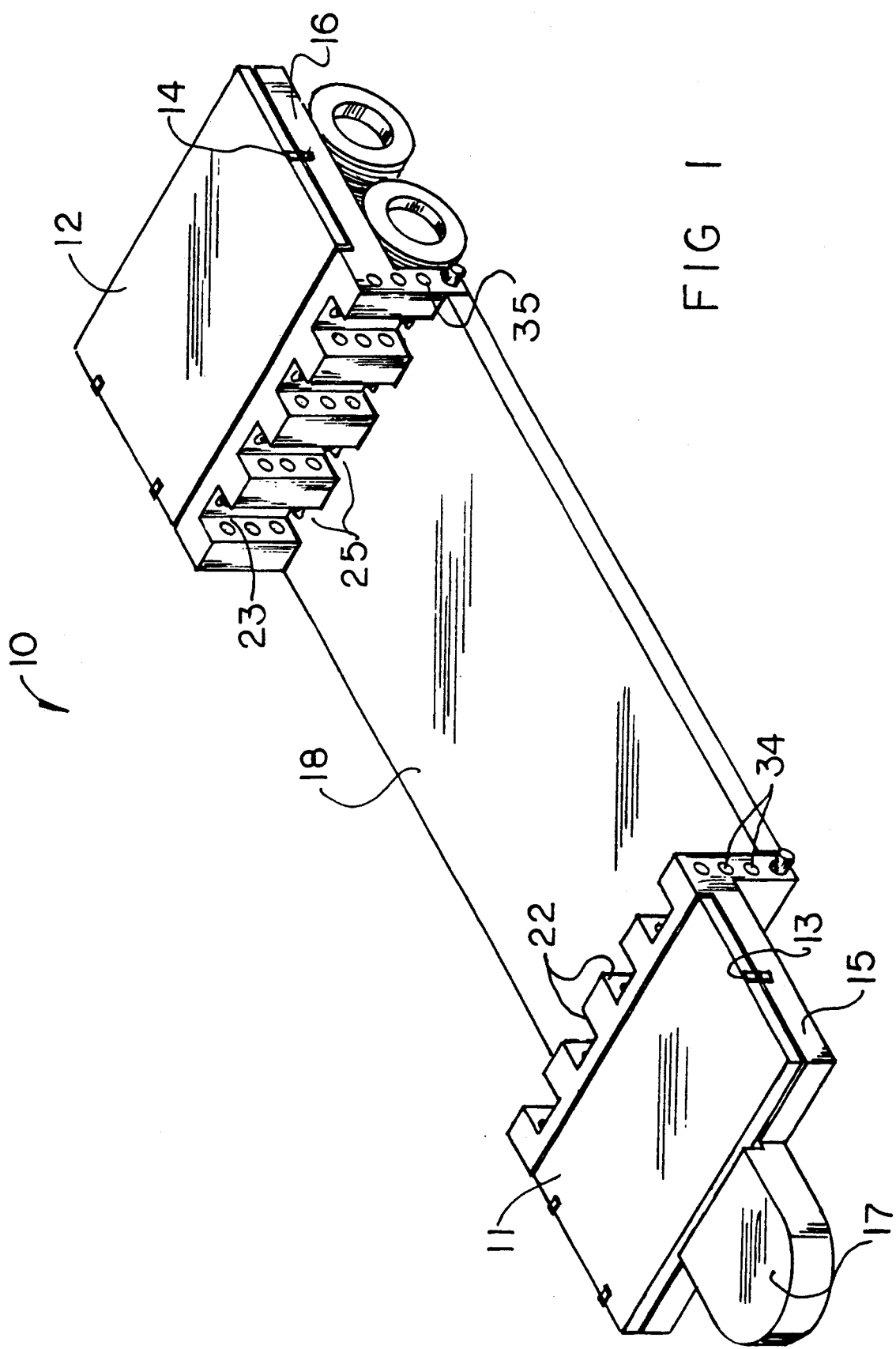

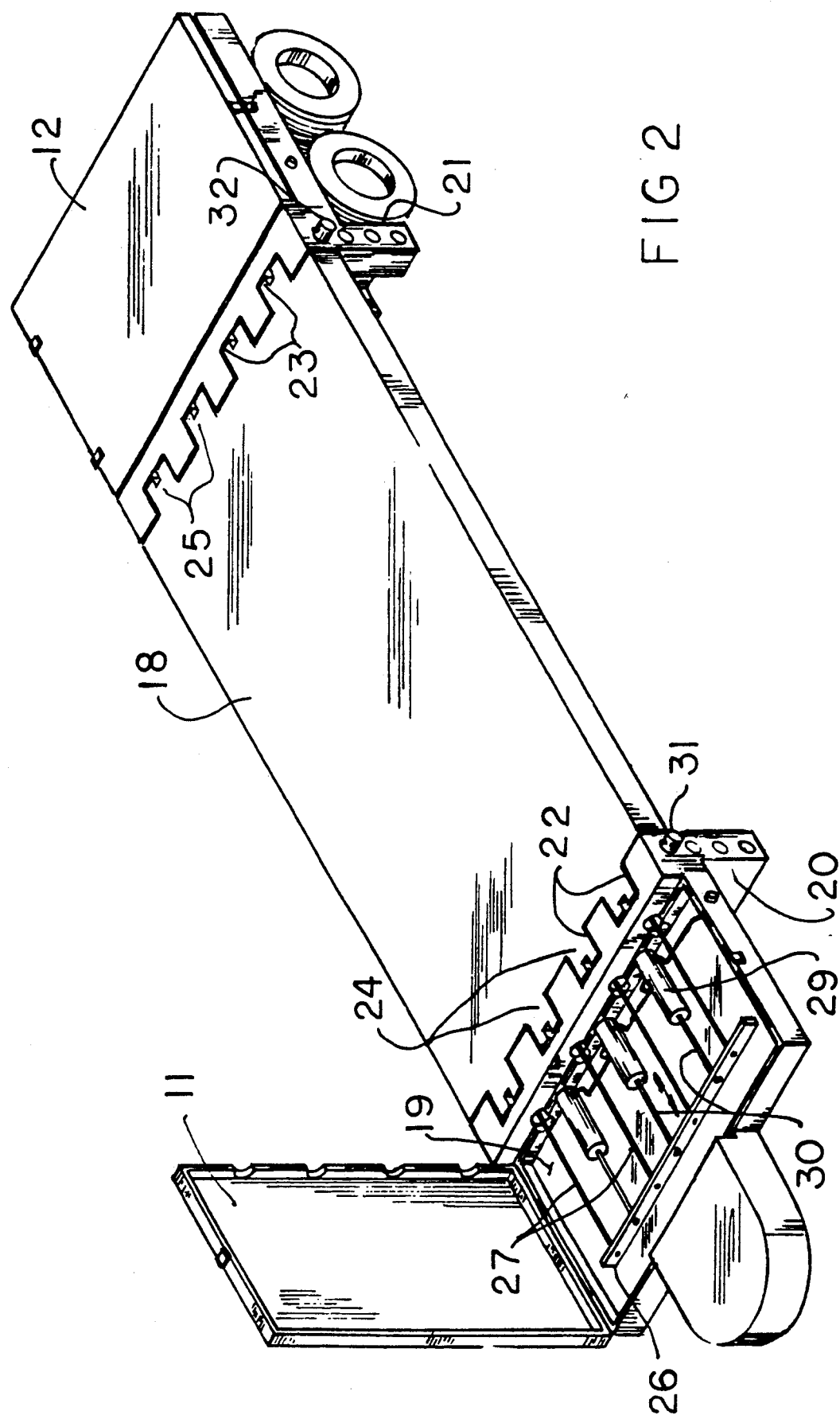

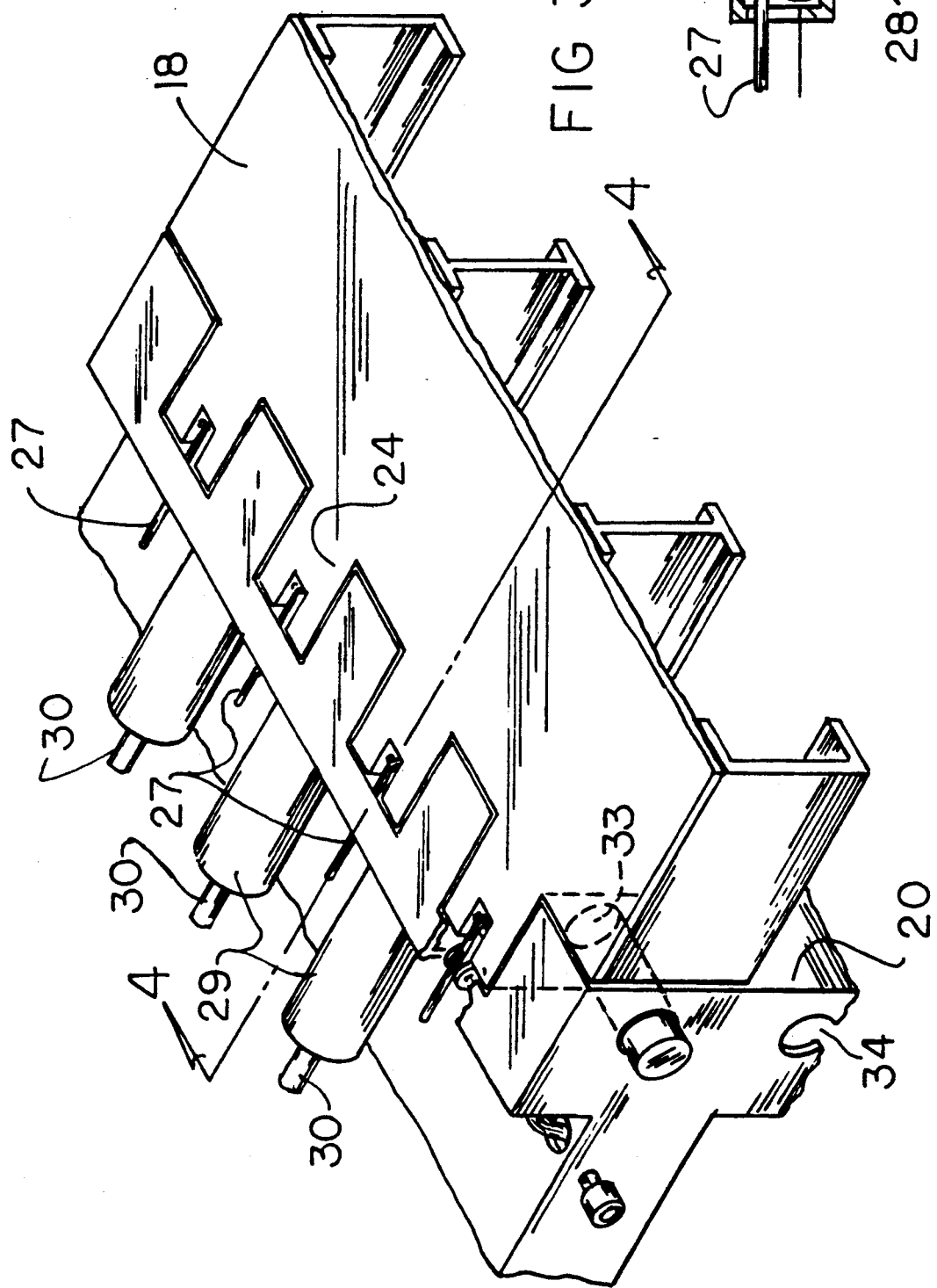

ADJUSTABLE DECK TRAILER APPARATUS

BACKGROUND OF THE INVENTION

1. Field of the Invention

The field of invention relates to trailer apparatus, and more particularly pertains to a new and improved adjustable deck trailer apparatus wherein the same is arranged to permit vertical adjustment of a medial trailer portion relative to forward and rear portions of the trailer structure.

2. Description of the Prior Art

Flatbed trailers of various types are utilized throughout the prior art, wherein such trailers are frequently required to accommodate greater loads and loads of irregular configuration. The instant invention addresses the problems of the prior art by directing the medial portion of the trailer to be adjustable in a vertical orientation to accommodate various load portions. An Example of prior art trailer structure is exemplified by U.S. Pat. No. 4,874,184 to Boyer wherein a trailer is arranged with a forward portion permitting its tilting relative to a rear portion by a fifth wheel connection of the trailer structure.

U.S. Pat. No. 4,149,468 to Garford sets forth a trailer arrangement wherein a bogie slide is arranged for positioning rear wheels of a tractor-trailer unit.

U.S. Pat. No. 4,906,021 to Rowe, et al. sets forth a prior art flatbed semi-trailer vehicle.

Further examples of flatbed trailer structures are set forth in the U.S. Pat. Nos. 4,761,031 and 4,917,020 to Rowe and Wicks respectively.

Accordingly, it may be appreciated that there continues to be a need for a new and improved adjustable deck trailer apparatus as set forth by the instant invention which addresses both the problems of ease of use as well as effectiveness in construction in accommodating various loadings on a flatbed trailer and in this respect, the present invention substantially fulfills this need.

SUMMARY OF THE INVENTION

In view of the foregoing disadvantages inherent in the known types of trailer apparatus now present in the prior art, the present invention provides an adjustable deck trailer apparatus wherein the same permits vertical adjustment relative to a truck-trailer apparatus. As such, the general purpose of the present invention, which will be described subsequently in greater detail, is to provide a new and improved adjustable deck trailer apparatus which has all the advantages of the prior art trailer apparatus and none of the disadvantages.

To attain this, the present invention provides a trailer construction including forward and rear deck surfaces arranged in a central coplanar relationship having an intermediate deck vertically adjustable relative to the forward and rear decks. A hydraulic push bar is mounted below each forward and rear deck operative to project a push bar forwardly within the forward and rear portions of the trailer structure, with each push bar having rearwardly directed cables mounted to the intermediate trailer portion to effect raising and lowering of the trailer portion relative to the forward and rear surfaces of the trailer.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable deck trailer apparatus which has all the advantages of the prior art trailer apparatus and none of the disadvantages.

It is another object of the present invention to provide a new and improved adjustable deck trailer apparatus which may be easily and efficiently manufactured and marketed.

It is a further object of the present invention to provide a new and improved adjustable deck trailer apparatus which is of a durable and reliable construction.

An even further object of the present invention is to provide a new and improved adjustable deck trailer apparatus which is susceptible of a low cost of manufacture with regard to both materials and labor, and which accordingly is then susceptible of low prices of sale to the consuming public, thereby making such adjustable deck trailer apparatus economically available to the buying public.

Still yet another object of the present invention is to provide a new and improved adjustable deck trailer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the invention with a medial deck portion in a raised orientation relative to the forward and rear deck plates.

FIG. 3 is an isometric partial view of the fluid cylinders mounted relative to the trailer structure.

FIG. 4 is an orthographic view, taken along the lines 4—4 of FIG. 3 in the direction indicated by the arrows.

DESCRIPTION OF THE PREFERRED EMBODIMENT

Figure 5:
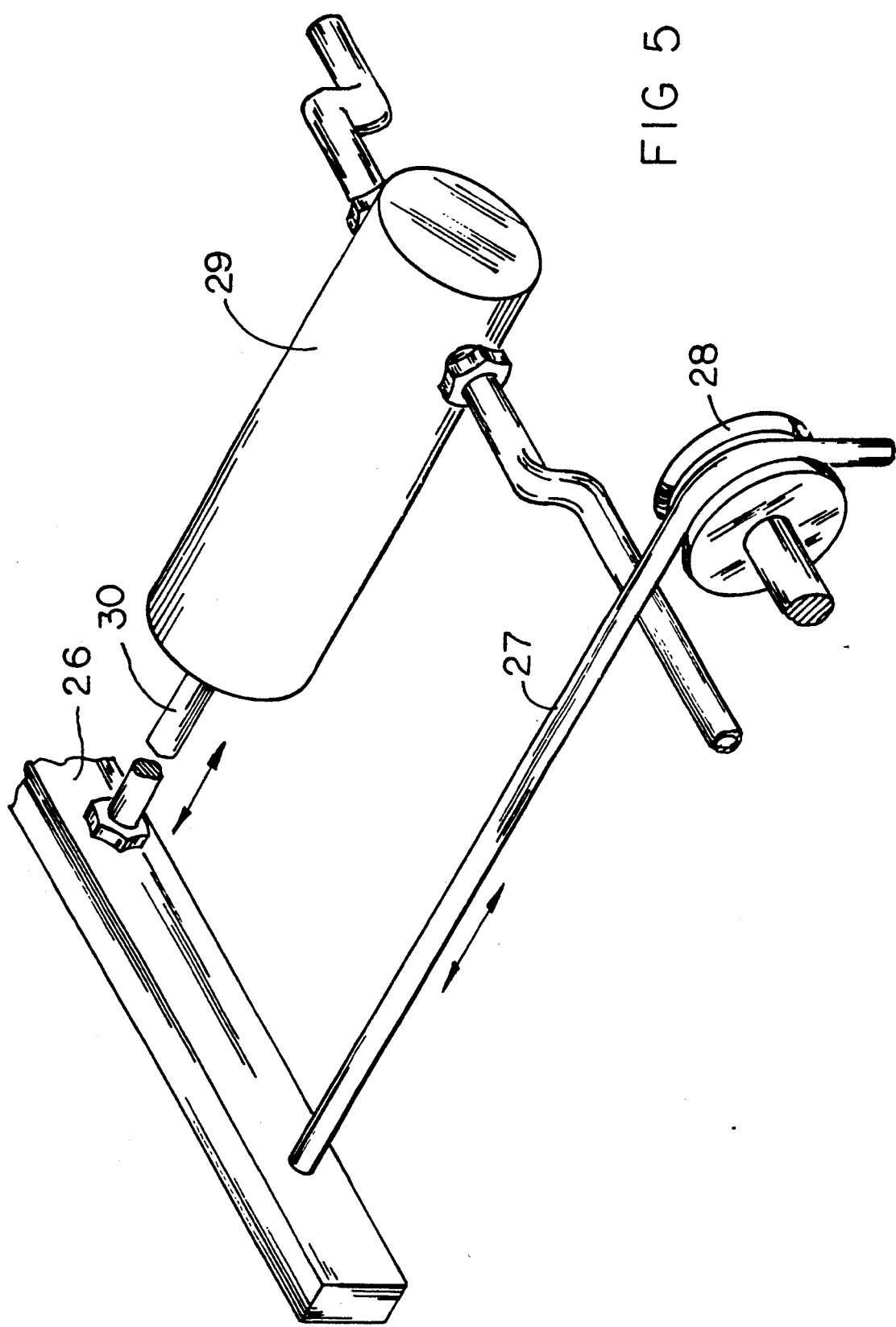
FIG. 5 is an isometric illustration illustrating the inter-relationship of the fluid cylinder relative to an associated draw cable.

With reference now to the drawings, and in particular to FIGS. 1 to 5 thereof, a new and improved adjustable deck trailer apparatus embodying the principles and concepts of the present invention and generally designated by the reference numeral 10 will be described.

More specifically, the adjustable deck trailer apparatus 10 of the instant invention essentially comprises a trailer forward deck plate 11 arranged in a coplanar relationship relative to a trailer rear deck plate 12 when the forward and rear deck plates are in a lowered orientation, as illustrated in FIG. 1. The deck plates include respective first and second latches 13 and 14 permitting pivotal movement of the forward and rear deck plates 11 and 12 about rear hinge structure, as illustrated in FIG. 2, to permit lifting of each deck plate The forward and rear deck plates 11 and 12 are mounted over forward and rear support beds 15 and 16, each having a support bed cavity 19, such as illustrated in FIG. 2. A trailer neck 17 mounted forwardly of the forward support bed 15 permits securement of the trailer structure relative to an associated tow vehicle (not shown). The central deck 18 oriented in a parallel relationship relative to the forward and rear deck plates 11 and 12 when they are in a lowered orientation relative to the trailer structure is vertically adjustable relative to the forward and rear deck plates along respective forward and rear support flanges 20 and 21 that are orthogonally oriented in turn to the respective forward and rear support beds 15 and 16. The forward and rear distal ends of the central deck 18 are slidably mounted relative to the forward and rear support flanges 20 and 21. More specifically, a plurality of forward and rear flange grooves 22 and 23 that are oriented in a parallel relationship along the respective forward and rear support flanges 20 and 21 are orthogonally oriented relative to the central deck 18. The central deck 18 in turn includes plural pairs of forward and rear ribs 24 and 25 received intermediate the respective forward and rear grooves 22 and 23 to provide for alignment of the central deck relative to the trailer structure.

To effect a raising or lowering of the central deck 18, each support bed cavity 19 (the support bed cavity of the forward support bed 15 as illustrated but it should be understood that the forward and rear support bed structures are identical and for purposes of illustration, only one such structure is described) includes a push bar 26 arranged in a parallel relationship relative to an associated forward or rear flange 22 and 23. Each push bar 26 includes a plurality of parallel spaced rib cables 27 mounted from the push bar extending rearwardly along a guide roller 28 contained within an associated flange structure (see FIG. 4) and directed and secured within an associated rib, such as rib 24, of the forward and rear end portions of the central deck 18. A plurality of fluid cylinders 29 are fixedly and orthogonally mounted to a forward surface of each support flange, with each fluid cylinder 29 having a fluid cylinder push rod 30 reciprocatably mounted within each fluid cylinder (utilizing conventional hydraulic or pneumatic control therefore) to effect forward or rear projection of the associated push rod 30 relative to an associated fluid cylinder to effect selective spacing or drawing closer of an associated push bar relative to an associated support flange. Upon projecting a push bar in a spaced relationship relative to a support flange, the cables 27 are tensioned and accordingly effecting simultaneous lifting of the central deck 18. It should be understood that the fluid cylinders of the forward and rear support beds 15 and 16 are operated simultaneously to avoid cocking of the central deck relative to the forward and rear support beds 15 and 16.

Further, a forward and rear lock pin 31 and 32 are provided and orthogonally directed into a side of the respective forward and rear support flanges 20 and 21. The forward and rear lock pins 31 and 32 are received within associated lock pin receiving rib bores 33 (see FIG. 3) from an associated forward or rear flange receiving bore 34 and 35 to effect a locking of the associated forward and rear portions of the central bed relative to the trailer structure. The lock pins are utilized subsequent to adjustment of the central deck relative to the trailer organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An adjustable deck trailer apparatus, comprising,
   a trailer forward support bed spaced from a trailer rear support bed, the forward support bed having a forward deck plate pivotally mounted to the forward support bed, and
   the rear support bed having a rear deck plate pivotally mounted to the rear support bed, and
   a first latch mounted to the forward deck plate arranged for securement of the forward deck plate in a first position secured to the forward support bed, the rear deck plate having a second latch securable to the rear support bed to secure the rear deck plate to the rear support bed in a first position, the forward deck plate and the rear deck plate arranged for pivotal spacing relative to the forward support bed and a rear support bed respectively in a second position, the forward deck plate and the rear deck plate arranged in a coplanar relationship relative to one another in the first position, and a central deck vertically and adjustably mounted relative to the forward deck plate and rear deck plate positioned therebetween in a sliding relationship, with the central deck parallel to the forward deck plate and the rear deck plate in the first position, and the forward support bed and rear support bed each include a support bed cavity below a respective forward deck plate and rear deck plate, and each support bed cavity includes adjusting means to effect raising and lowering of the central deck relative to the forward support bed and rear support bed, and the forward support bed includes a forward support flange extending orthogonally downwardly relative to the forward support bed, the rear support bed includes a rear support flange extending orthogonally downwardly relative to the rear support bed, the forward support flange and the rear support flange are arranged in a confronting relationship relative to one another in a parallel spaced relationship having the central deck slidably mounted within the forward support flange and the rear support flange, with a forward portion of the central deck received within the forward support flange, and a rear portion of the central deck received within the rear support flange, and the forward portion of the central deck includes a plurality of pairs of forward ribs, the rear portion of the central bed includes a plurality of rear ribs arranged in a parallel relationship, and the forward flange includes a plurality of forward flange grooves arranged for interdigited relationship relative to the forward ribs, the rear support flange includes a plurality of rear flange grooves arranged for interdigited relationship with the rear ribs.

2. An apparatus as set forth in claim 1 wherein each adjusting means includes a push bar mounted within each support bed cavity, each push bar includes a plurality of rib cables mounted rearwardly from each push bar to the respective forward and rear ribs of the central deck, and each support bed cavity includes a plurality of fluid cylinders, and each of the fluid cylinders including a push rod, the push rods slidably contained within a respective fluid cylinder, and a forward distal end of each push rod mounted to a respective push bar within a respective support bed cavity.

3. An apparatus as set forth in claim 2 wherein each forward and rear support flange includes at least one guide roller receiving a single rib cable thereover for sliding guidance of each rib cable.

4. An apparatus as set forth in claim 3 wherein the forward support flange and the rear support flange includes respective forward flange and rear flange bores oriented orthogonally relative to the respective forward and rear ribs, and a forward and rear lock pin mounted within the respective forward and rear flange for reception within a respective forward and rear rib for selective locking of the forward and rear ribs relative to the respective forward and rear support flanges.

* * * * *